United States Patent Office

3,589,952
Patented June 29, 1971

3,589,952
SLURRY FOR BRAZING METAL SURFACES
Frederick A. Burne, Hamden, Conn., assignor to
Olin Mathieson Chemical Corporation
No Drawing. Filed July 5, 1968, Ser. No. 742,527
Int. Cl. B23k 35/30
U.S. Cl. 148—24          7 Claims

ABSTRACT OF THE DISCLOSURE

An improved method for brazing cuprous or ferrous surfaces utilizing an admixture of brazing powder and certain hydroxy-containing organic compounds. The organic compounds provide an effective medium for adhering the brazing powder to a metallic surface and enable the preparation of a convenient, easy to use, brazing slurry.

---

In accordance with art practice, cuprous and ferrous surfaces are brazed utilizing a thin film or coating of brazing alloy. The brazing alloy is generally in powder or flake form, admixed in a carrier. The slurry of carrier and brazing alloy is coated on the surface to be brazed and the coated surface heated to braze temperature to the requisite period of time.

The pricipal purpose of the carrier is to provide a convenienty slurry of brazing alloy so that it may be readily and easily applied to the surface to be brazed. In addition, the carrier should be such as to enable the slurry to readily adhere to the brazing surface.

For example, copper and copper alloy mill stock may be brazed, utilizing a thin film or coating of a high phosphorus containing copper base alloy in a polymerized methacrylate resin carrier.

Heretofore, art processes have not been entirely satisfactory. For example, art processes frequently are expensive and inconvenient to use. Often, the carrier-brazing alloy mixture must be utilized immediately and cannot be conveniently stored. Often, the carrier-brazing alloy mixture dries to a brittle or sticky solid which is inconvenient to use.

Other disadvantages of art processes exist such as, for example, the fact that conventional carriers frequently leave undesirable residue on the brazed surfaces.

Accordingly, it is a principal object of the present invention to provide a simple and convenient method for brazing cuprous and ferrous surfaces.

It is a further object of the present invention to provide a convenient and easily utilizable brazing slurry.

It is a further object of the present invention to provide a brazing slurry useful, for example, in brazing cuprous and ferrous surfaces, which slurry is easy to utilize, inexpensive, storable, and does not leave objectionable residues on the brazed surfaces.

Further objects and advantages of the present invention will appear hereinafter.

In accordance with the present invention, it has now been found that the foregoing objects and advantages are readily obtained. The brazing slurry of the present invention comprises an admixture of a brazing metal alloy powder having a melting point above 1000° F., a particle size of 80 mesh or smaller, suitable for brazing cuprous and ferrous surfaces in admixture with from 3 to 10% by weight of a hydroxy-containing polyoxyalkylene organic compound having a boiling point between 500 and 1000° F. and having a molecular weight of at least 200, preferably between 900 and 1400. Optionally, a solvent may be added which is volatile at ambient temperatures, such as acetone or methyl ethyl ketone, in order to provide the desired consistency for the desired use the solvent should be compatible with the polyol and should volatilize upon application of the mixture to the surfaces to be joined.

The present invention also comprises a method of preparing a brazed metal article which comprises: providing metal surfaces to be joined selected from the group consisting of copper, copper base alloys, and ferrous alloys; applying to the surfaces to be joined a slurry of a brazing metal alloy powder having a melting point above 1000° F., a particle size of 80 mesh or smaller, suitable for brazing said metal surfaces in admixture with from 3 to 10% by weight of a hydroxy-containing polyoxyalkylene organic compound having a boiling point from 500 to 1000° F. and a molecular weight of at least 200, preferably between 900 and 1400, plus optionally a solvent which is volatile at ambient temperature; forming an assembly by placing the surfaces to be joined with interposed slurry into intimate contacting relationship; heating said assembly to a temperature above the boiling point of said hydroxy-containing compound and above the melting point of said brazing alloy, but below the melting point of said metal surfaces, thereby forming a brazed assembly.

In accordance with the present invention, numerous significant advantages are achieved. In the first place, the slurry is in the form of a viscous fluid which is readily applied to the surfaces to be brazed. Frequently, art processes utilize a slurry which dries to an inconvenient brittle solid. In addition, the slurry of the present invention is readily storable. The slurry may be readily stored for many days or even longer without danger of damage. The slurry is easily prepared in a tumbler or barrel assembly without danger of damaging or gumming up the equipment. In addition and significantly, the hydroxy-containing compound does not leave undesirable residues on the brazed assembly.

In accordance with the present invention, the surfaces to be brazed may be copper, copper base alloys, or ferrous alloys. Naturally, the particular surface to be brazed will depend upon the desired use of the components. Any copper base alloy or high purity copper may be employed, such as copper base alloys containing as alloying additions nickel, iron, phosphorus, manganese, magnesium, aluminum, and so forth. Any ferrous alloy may be employed, such as stainless steel or iron base alloys containing silicon, manganese, phosphorus, chromium, nickel and so forth.

The surfaces to be joined may be in any desired form, such as sheet or plate, strip, angle, tube or bar stock. It is a preferred embodiment of the present invention to utilize the brazing slurry of the present invention in bonding cuprous powder or shot. Thus, in accordance with this preferred embodiment, cuprous powder or shot is coated with the brazing slurry of the present invention, the coated shot is brazed in an assembly or fixture having the desired shape and the assembly or fixture heated to a temperature above the boiling point of the hydroxy-containing compound and above the melting point of the brazing alloy, but below the melting point of the surfaces to be joined, so that the shot or powder is brazed into a firm, solid mass. Brazing conditions may, of course, be varied to provide that the bonded mass have an appropriate degree of porosity, that is the bonded particles are generally bonded at discrete points and unbonded at other points.

In accordance with the present invention, the brazing alloy must be a powdered brazing alloy having a melting point in excess of 1000° F. Naturally, any brazing alloy suitable for brazing the desired metal surfaces may be readily employed. Typical brazing alloys include, but are not limited to, phosphorous cuprous powder having a phosphorous content of from 5 to 15%, copper base alloys containing such elements as tin and manganese, nickel base alloys to braze steels, and commercial purity copper to braze steels.

The amount of the brazing alloy will naturally vary widely depending on the application. When large sheet stock is being brazed, a small amount of braze alloy is used based on the weight of the sheet stock and when small parts are being brazed, a larger amount of braze alloy is used. When shot or powder is being brazed, from 4 to 15% by weight of the shot is used.

The particle size of the powdered brazing alloy should be 80 mesh or smaller and preferably 100 mesh or smaller. Powder containing coarser particles, such as 80 to 100 mesh, may be satisfactorily used although these are more difficult to employ.

The carrier of the present invention is a hydroxy-containing polyoxyalkylene organic compound having a molecular weight above 200, generally below 4000 and preferably between 900 and 1400 and having a boiling point between 500 and 1000° F. The hydroxy-containing organic compound should have a viscosity preferably between 50 and 125 centistokes at 100° F. and should substantially completely volatilize on heating in excess of the boiling point, preferably without cracking or breaking down, i.e., should leave substantially no residue. In addition, it should have non-toxic combustion products and should be readily combustible. The hydroxy-containing organic compound should be substantially non-aqueous and be substantially non-hygroscopic.

The organic compounds which are used should be oxyalkylene, polymeric derivatives of hydroxy compounds, aromatic or aliphatic, such as substituted phenols, alcohols. Oxyalkylene groups can be $C_2H_4O$, $C_3H_7O$, $C_4H_9O$, etc., but preferably are $C_2H_4O$ and $C_3H_7O$. Representative materials include polypropylene diols, polypropylene thiols, nonyl phenol-oxyethylene adducts, and polyethoxylated higher alcohols.

If desired, a brazing flux may be added to the slurry for non-atmospheric brazing.

In accordance with the present invention, the brazing alloy and the organic compound are admixed to form a slurry. From 3 to 10% by weight of organic compound is utilized in the admixture. When brazing shot, it is preferred to use from 3–6% by weight of organic compound, and when brazing other articles, such as sheet, plate or tubes to headers, it is preferred to use 6–10%. The organic compound and brazing alloy are intimately admixed so that a slurry of the desired consistency is provided. A slurry of thinner consistency may be utilized if it is desired to paint or spray the slurry on the metal surfaces to be brazed. A thinner consistency may be readily obtained by varying the amount of the organic compound and/or using a solvent which is volatile at ambient temperatures. Alternatively, the slurry may be provided in a paste or viscous form by utilizing a smaller amount of organic compound and/or no solvent. Any desired consistency may be provided, depending upon the ultimate end use, all within the foregoing proportions of organic compound to brazing alloy.

The slurry is then applied to the surfaces to be brazed and an assembly is provided by placing the surfaces to be joined with interposed slurry into intimate contacting relationship. The assembly is then heated to a temperature above the melting point of the brazing alloy. This effectively volatilizes the organic compound and melts the brazing alloy on the surfaces to be joined. The heating time at temperature should be from 3 to 15 minutes.

Alternatively, if shot is being brazed, one should coat the shot with the slurry, place the coated shot in a desired form or fixture and heat as above.

The assembly is then cooled to provide a brazed, firmly bonded assembly.

The present invention will be readily understandable from a consideration of the illustrative examples which form a part of the present specification.

EXAMPLE I

This example illustrates brazing shot material in accordance with the present invention. In accordance with this example, four different shot materials were used: commercial purity copper mesh size —14 +20; commercial purity copper mesh size —60 +80; stainless steel 304 (containing 19% chromium and 10% nickel) mesh size —14 +20; and stainless steel 304 mesh size —60 +80. The copper shot used as brazing alloy was a cuprous base alloy powder having a phosphorus content of about 8%. The stainless steel shot used as brazing alloy was a nickel base alloy powder containing: 0.36% carbon; 4.5% silicon; 0.2% iron; 2.9% boron; and the balance nickel.

The shot material to be brazed was charged into a tumbler along with a charge of polypropylene diol having a nominal molecular weight of 1000 and a viscosity of 75 centistokes of 100° F. Approximately 4 cc. of polypropylene diol was used per kilogram of shot. The shot and polypropylene diol were blended together for about six (6) minutes to thoroughly wet the shot with polypropylene diol. The brazing alloy powder was then added in the following amounts: the copper base alloy brazing powder was added in an amount of 6% by weight of the shot; and the nickel base alloy brazing powder was added in an amount of 10% by weight of the shot. The brazing alloy was added gradually while the polypropylene diol-shot mixture was tumbling. The tumbling was continued until the mass was thoroughly mixed. The mass was placed in a fixture of the desired shape and placed in an atmosphere furnace. The furnace was heated to a temperature in excess of 1000° F. for from 3–15 minutes, the heated mass removed from the furnace and cooled to room temperature. The result was a well bonded mass which was porous and freely allowed the passage of air or gas therethrough.

EXAMPLE II

This example illustrates brazing by applying the brazing slurry of the present invention by painting, spraying or extruding to joints, including shells seals, tube to header seals, etc.

This example utilized the same materials as in Example I, i.e., the articles to be brazed were commercial purity copper and stainless steel 304, the brazing alloys were the same and the hydroxy-containing organic compound was the same.

The brazing alloy powder and polypropylene diol were thoroughly mixed using 6 to 10% by weight of diol to brazing alloy powder. The materials were thoroughly mixed together to a paste consistency that would not run when applied to a vertical surface. The resulting mixture was storage stable.

Just prior to use, an acetone solvent was added in an amount to get the mixture to a workable fluidity. The mixture was applied to the joint to be brazed, for example, copper tubes to copper header. The acetone evaporated almost immediately, leaving a paste which was thick enough to stay in place. The assembly was placed in an atmosphere furnace, heated to above 1000° F. and held at temperature for from 3–15 minutes. The mass was removed from the furnace and cooled to room temperature. The resulting assembly was firmly bonded.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A brazing slurry for use in brazing metal articles which consists essentially of a brazing metal alloy powder having a melting point above 1000° F. and a particle size of 80 mesh or smaller in intimate admixture with from 3 to 10% by weight of a non-aqueous, non-hygroscopic hydroxy-containing polyoxyalkylene organic compound having a boiling point between 500 and 1000° F. and having a molecular weight of at least 200.

2. A slurry according to claim 1 wherein said organic compound has a molecular weight between 900 and 1400.

3. A slurry according to claim 2 wherein said organic compound is a polypropylene diol.

4. A slurry according to claim 1 including a solvent which is volatile at ambient temperature.

5. A slurry according to claim 1 wherein said brazing alloy is a copper base alloy containing from 5 to 15% phosphorus.

6. A slurry according to claim 1 wherein said brazing alloy is a nickel base alloy.

7. A slurry according to claim 1 wherein said brazing alloy has a particle size of 100 mesh or smaller.

References Cited

UNITED STATES PATENTS

| 2,547,771 | 4/1951 | Pessel | 148—24 |
| 2,566,339 | 9/1951 | Klinker | 148—24 |
| 2,606,132 | 8/1952 | Klinker | 148—24 |
| 2,631,952 | 3/1953 | Williams | 148—24 |
| 2,759,446 | 8/1956 | Ewing | 148—22 |
| 2,908,072 | 10/1959 | Johnson | 117—22 |
| 3,073,270 | 1/1963 | Johnson et al. | 148—24 |
| 3,108,020 | 10/1963 | Van der Willingen et al. | 148—24 |

L. DEWAYNE RUTLEDGE, Primary Examiner

W. W. STALLARD, Assistant Examiner